(12) United States Patent
Guering et al.

(10) Patent No.: US 8,500,069 B2
(45) Date of Patent: Aug. 6, 2013

(54) DEVICE FOR MOVING OBJECTS, INTENDED IN PARTICULAR FOR LUGGAGE IN A HOLD OF AN AIRCRAFT

(75) Inventors: Bernard Guering, Montrabe (FR); Laurent Saint-Marc, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 621 days.

(21) Appl. No.: 12/664,089

(22) PCT Filed: Jun. 13, 2008

(86) PCT No.: PCT/FR2008/000821
§ 371 (c)(1),
(2), (4) Date: Dec. 11, 2009

(87) PCT Pub. No.: WO2009/007548
PCT Pub. Date: Jan. 15, 2009

(65) Prior Publication Data
US 2010/0181429 A1 Jul. 22, 2010

(30) Foreign Application Priority Data
Jun. 15, 2007 (FR) ..................................... 07 04291

(51) Int. Cl.
*B64D 9/00* (2006.01)
(52) U.S. Cl.
USPC ...................................... 244/137.1; 244/118.1
(58) Field of Classification Search
USPC ..................... 244/118.1, 118.2, 129.1, 137.1; 410/127–130
See application file for complete search history.

(56) References Cited

U.S. PATENT DOCUMENTS

| 3,722,717 | A | * | 3/1973 | Stryczek | 414/521 |
| 4,747,747 | A | * | 5/1988 | Fusco et al. | 414/528 |
| 4,805,852 | A | * | 2/1989 | Nordstrom | 244/137.1 |
| 4,878,635 | A | * | 11/1989 | Nordstrom | 244/137.1 |
| 4,984,756 | A | * | 1/1991 | Anders | 244/137.1 |
| 5,046,690 | A | * | 9/1991 | Nordstrom | 244/137.1 |
| 5,163,801 | A | * | 11/1992 | Nordstrom | 414/525.1 |
| 5,170,968 | A | * | 12/1992 | Helmner | 244/137.1 |
| 6,367,615 | B1 | * | 4/2002 | Helmner | 198/750.1 |
| 6,679,371 | B2 | * | 1/2004 | Hooijen et al. | 198/750.1 |

(Continued)

FOREIGN PATENT DOCUMENTS

DE 3790247 C1 * 11/2001
EP 0 081 695 6/1983

(Continued)

OTHER PUBLICATIONS

Russian Decision on Grant issued May 16, 2012, in Patent Application No. 2010101060/11 (with English-language translation).

*Primary Examiner* — Benjamin P Lee
(74) *Attorney, Agent, or Firm* — Oblon, Spivak, McClelland, Maier & Neustadt, L.L.P.

(57) ABSTRACT

The invention relates to a device for moving objects, particularly luggage, in an aircraft hold, said device including a moving wall (10) and at least one belt. One end of the belt (20) is connected to a roller (24) around which the belt (20) is wound. The other end of the belt (20) is attached to the moving wall (10). A lower section of the belt (20) extends from the moving wall (10) to a threshold element (22) and an upper section of the belt (20) extends from the threshold element (22) to the moving wall (10).

14 Claims, 6 Drawing Sheets

U.S. PATENT DOCUMENTS

| | | | |
|---|---|---|---|
| 7,410,128 B2 * | 8/2008 | Nordstrom | 244/137.1 |
| 7,699,575 B2 * | 4/2010 | Frankel | 414/395 |
| 8,152,103 B2 * | 4/2012 | Guering | 244/118.5 |
| 2005/0224658 A1 * | 10/2005 | Nordstrom | 244/137.1 |
| 2006/0186271 A1 * | 8/2006 | Jacobsen et al. | 244/137.1 |
| 2009/0159743 A1 | 6/2009 | Guering et al. | |
| 2009/0294585 A1 * | 12/2009 | Schmidt et al. | 244/118.1 |
| 2010/0170992 A1 * | 7/2010 | Guering | 244/129.5 |
| 2010/0219291 A1 * | 9/2010 | Guering | 244/118.5 |
| 2010/0243813 A1 * | 9/2010 | Nordstrom | 244/137.1 |

FOREIGN PATENT DOCUMENTS

| | | |
|---|---|---|
| FR | 2 029 896 | 10/1970 |
| SU | 667431 | 6/1979 |
| WO | 98 38087 | 9/1998 |
| WO | WO 03/097454 A1 | 11/2003 |
| WO | WO 2008118076 A1 * | 10/2008 |

* cited by examiner

DEVICE FOR MOVING OBJECTS, INTENDED IN PARTICULAR FOR LUGGAGE IN A HOLD OF AN AIRCRAFT

This invention relates to a device for moving objects, intended in particular for baggage in a hold of an aircraft.

In an aircraft intended for the transport of passengers, the passengers carry a portion of their baggage along with them in the cabin of the aircraft, while the bulkier and heavier baggage travels in the hold. The latter baggage is transported to the aircraft with the aid of conveyors or on towed carts. There are conveyors making it possible to transport baggage up to the door of the hold of the aircraft. Placement inside the hold usually is performed manually. An operator grasps the bag arriving in the hold and goes to put it inside the latter. These operations for placing baggage in the hold are laborious. The hold is a relatively cramped space in which most of the time it is not possible to stand upright. Furthermore, certain bags can be heavy. Going to place the first bags at the back of the hold during loading of the baggage or else, during unloading of the baggage, going to look for the bags located at the back of the hold in order to remove them, is the most difficult.

All these difficulties in arranging baggage in the hold make the time for loading and unloading of the passengers' baggage relatively long. The passengers, after getting off the aircraft, then have to wait for their baggage in the air terminal. For this reason, many passengers prefer to carry all their bags, even some relatively bulky ones, along in the cabin, rather than have them travel in the hold.

To encourage the passengers to have their baggage travel in the hold, and to free up the cabin space, thus making it possible to enhance the comfort of the passengers during their trip and on boarding/deplaning, it is advisable to limit the waiting time for retrieval of the baggage having traveled in the hold.

Document WO-98/38087 describes a device for loading baggage into a cargo hold of an aircraft. This device comprises a belt having an upper section and a lower section. At each end of this belt there is associated a roller, the two rollers being located at the same end of the aircraft hold. The belt extends continuously all along the hold with an upper section and a lower section. A moving wall is mounted on the upper section of the belt. In order to move the moving wall and the items located on the belt, one roller is wound while the other is unwound, or vice versa.

As regards document EP-0 081 695, it relates to a vehicle such as a truck, and more particularly a trailer or a semi-trailer. The device described comprises a belt associated with a moving wall. The moving wall is on the one hand activated by cables coming to be wound on rollers located at one end of the trailer and on the other hand it is activated by a belt coming to be wound at another end of the trailer by passing over a return-roller.

As regards document FR-2 029 896, it discloses a trailer equipped with an unloading conveyor fully retractable when the bed of the trailer is to be completely cleared or the latter is to be used as a dump truck.

BRIEF SUMMARY

This invention then has as a purpose to provide a device making it possible to facilitate the task of the operators given the job of placing baggage in an aircraft hold and unloading this hold.

Another purpose of the invention is to provide means making it possible to unload the hold of an aircraft more rapidly in order to limit, or even eliminate, the waiting time for baggage when the passengers come to the air terminal upon their arrival.

Advantageously, the system according to the invention is a modular system that can be adapted to a hold accommodating both containers and baggage. Preferably, this device will be able to make it possible to adapt the space provided for baggage in the hold according, in particular, to the number of containers to be transported.

To this end, this invention proposes a device for moving objects, particularly baggage, in an aircraft hold, comprising a moving wall and at least one belt.

According to this invention, one end of the belt is connected to a roller on which the belt is intended to come to wind; the other end of the belt is fastened to the moving wall; a lower section of the belt extends from the moving wall up to a threshold, and an upper section of the belt extends from the threshold up to the moving wall.

In this way, in order to load an aircraft hold, an operator can set objects down on the upper section of the belt against the moving wall, then move the said moving wall then bringing about an unwinding of the belt. The objects then are carried along with the moving wall and a clear space appears on the belt. It then is possible to place objects again and thus to continue the operation. In the opposite direction, in order to unload the hold, objects taken away from the moving wall are removed in order to free up space on the upper section. The belt then is wound on the corresponding roller while the moving wall is moved, in this way making it possible to empty the hold of the aircraft in stages. If the moving wall is moved from a door allowing the loading of objects up to the back of the hold, it is unnecessary for the user to go to the back of the hold; all he has to do is access a zone of the belt close to the loading door. This device therefore makes it possible to facilitate the task of the operators loading and unloading an aircraft hold. It also offers the advantage of being able to use a belt of limited length.

In such a device, in order to move objects, the roller on which the belt is intended to come to wind advantageously is mounted on the moving wall, or at least is close thereto and moves with it. In this way, the device offers the advantage that the belt extends on only one side of the moving wall, or at least the congestion "behind" the moving wall is limited.

In a first embodiment of a device for moving objects according to the invention, the moving wall has cogwheels and is guided on corresponding racks fastened in the hold. The cogwheels permit a movement without sliding and allow a reliable movement of the moving wall. Each cogwheel can be driven by a motor. In that way, motorization for movement of the moving wall can be integrated into the said wall which is then autonomous. Then only an electric supply for the moving wall is necessary.

The threshold of a device for the movement of objects according to the invention comprises, for example, a roller extending crosswise in relation to the belt and with axis fixed in relation to the hold. This roller then serves as a reverser pulley: it allows the belt to turn 180° to make its way again toward the moving wall.

In order to best adapt to the form of the floor of a hold of an aircraft, a device according to the invention advantageously can comprise several belts, and each belt extends parallel to a more or less level portion of the hold between the moving wall and the threshold corresponding to the said belt. In fact, a hold usually has a more or less horizontal flat back positioned between two edges inclined so as to best adapt to the more or less circular form of the fuselage of the aircraft. By adapting the position of the belts in relation to the back of the hold, it thus is possible to completely cover the back of the hold and in this way to move objects efficiently therein. Preferably, the moving wall then has for each belt a roller on which the corresponding belt is intended to come to wind.

This invention also relates to an aircraft comprising a hold, characterized in that the hold is equipped with a device for moving objects such as described above. In such an aircraft, the hold preferably also is equipped with a cargo loading system comprising rollers or similar elements intended to accommodate a container, and the rollers of this cargo loading system can be moved between an active position in which they jut out over the floor of the hold and a retracted position in which they are located beneath the floor of the hold. In this way, the hold can accommodate containers just as well as various objects such as baggage. Containers can be loaded with the aid of the cargo loading system (also known under the English abbreviation "CLS" for Cargo Loading System) while other objects are loaded with the aid of a device according to this invention.

In order to optimize the loading of the hold with containers and other objects such as baggage, the hold preferably comprises at least two access doors: a first door is of sufficient size to allow introduction of a container of standardized size into the hold; a second door, of smaller size in relation to the first door, is positioned on the wall of the hold opposite the wall on which the first door is located and is offset in relation to the first door in such a way that the openings corresponding to the said doors do not overlap. In a preferred embodiment, the threshold of the device for moving objects is arranged at the second door on the side of the first door. In this way, the space in front of the second door is left clear for the operators handling the baggage during loading of the hold.

BRIEF DESCRIPTION OF THE DRAWINGS

Details and advantages of this invention will become more apparent from the description that follows, presented with reference to the attached schematic drawings on which.

DETAILED DESCRIPTION

Figure 1:
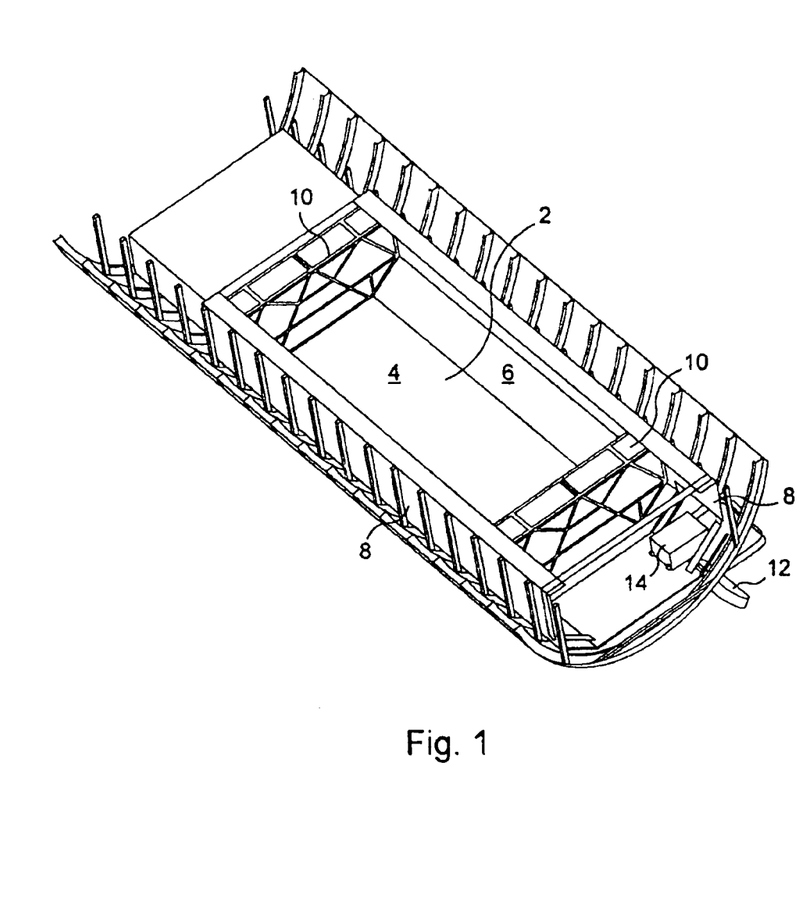
FIG. 1 shows a first aircraft hold equipped with a device for movement of objects according to this invention.
Figure 2:
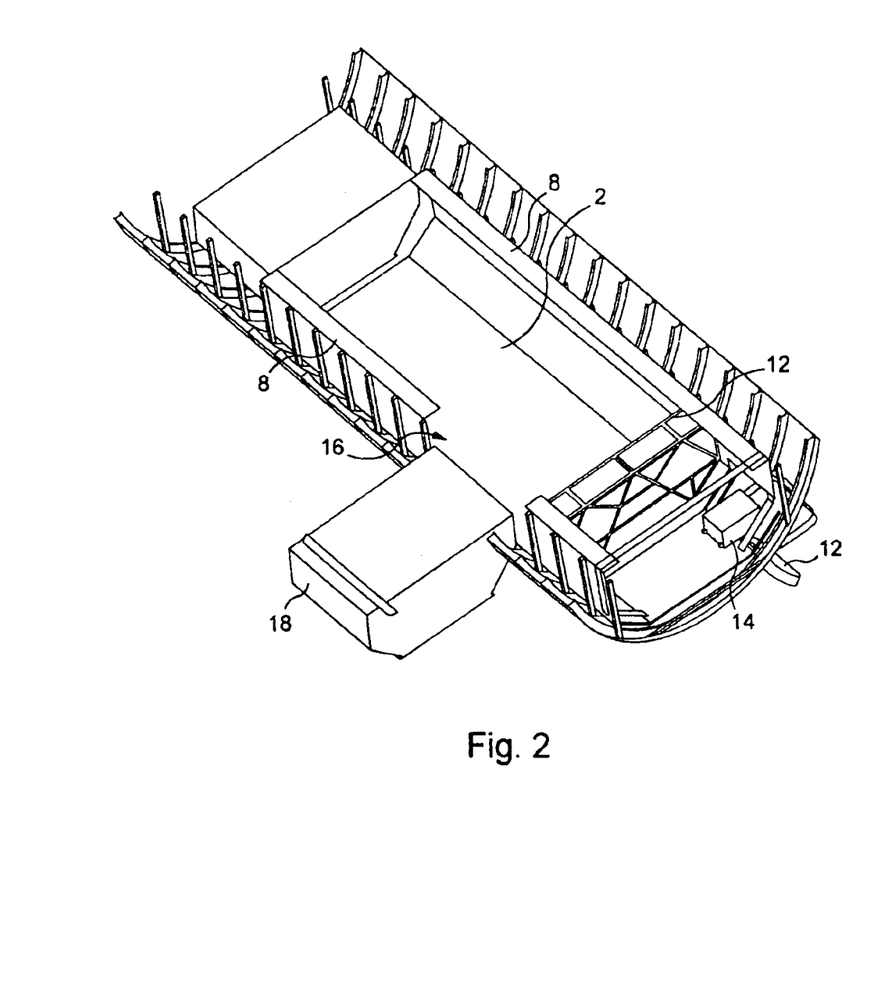
FIG. 2 shows an embodiment variant of the hold of FIG. 1.

The description that follows is presented with reference to an aircraft intended in particular for the transport of passengers. FIGS. 1 and 2 each show a hold of such an aircraft.

A hold floor 2 is seen on FIGS. 1 and 2. This floor is implemented in three parts: a more or less horizontal central part 4 and two raised side parts 6, inclined in relation to the central part 4. Of course, the references to horizontality and verticality in this patent application relate to the aircraft described when it is on the ground.

The hold also has more or less vertical side walls 8 which define the loading space of the hold. The ceiling thereof is not visible here.

On FIG. 1, a moving wall 10 of a device for movement of baggage according to the invention has been shown in two distinct positions. It should be noted, however, that a hold generally is equipped with only one moving wall 10.

The hold of FIG. 1 comprises as access only one baggage door 12. For the loading and unloading of the hold, baggage 14 passes through the said door.

The hold shown on FIG. 2 comprises as access, in addition to a baggage door 12, a container door 16. This door is of sufficient size to allow, for example, passage of a container 18 of LD3 type.

Figure 3:
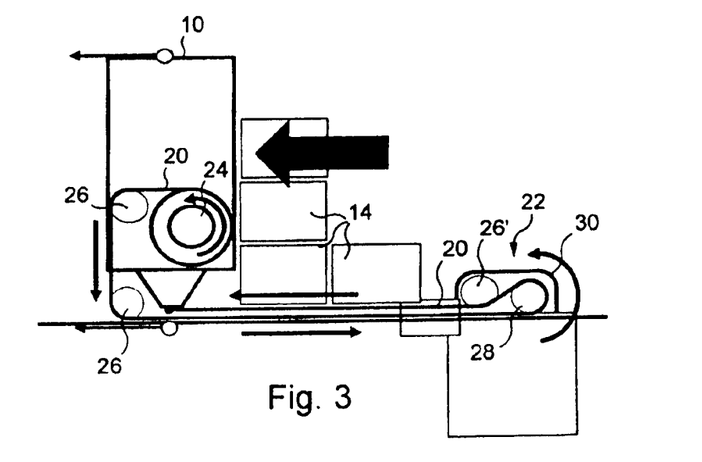
FIG. 3 is a schematic side view showing the operating principle of a device for movement of objects according to this invention.

FIG. 3 schematically shows a device for movement of objects according to the invention in order to better understand its functioning. Such a device comprises three main components: the moving wall 10 already mentioned above, a belt 20 and a threshold 22.

Moving wall 10 has a first roller 24 on which one end of belt 20 comes to wind. Guidance rollers 26 make it possible to ensure a good unwinding and a good guidance of belt 20. Belt 20 here is guided to pass beneath moving wall 10 parallel to floor 2 of the hold. It then extends toward threshold 22. The latter is mounted crosswise in relation to the hold on floor 2 thereof. It basically has a reverser roller 28, a guidance roller 26' and a fairing 30. Belt 20 passes beneath reverser roller 28 and starts off again toward moving wall 10 thus forming an upper section passing above the lower section described in the foregoing. Belt 20 passes beneath guidance roller 26' and makes it possible to keep the upper section close to the lower section. Belt 20, or more precisely one of its ends, then is fastened at the bottom of moving wall 10.

The functioning then is the following: when moving wall 10 moves away from threshold 22, moving wall 10 pulls with it the upper section of belt 20. Reverser roller 28 acts as a pulley and then comes to pull the lower section of belt 20. The latter then is unwound from first roller 24. When baggage 14 is placed against moving wall 10, it is noted that this is carried along with the said wall. In this way, baggage 14 can be loaded just in front of moving wall 10, by placing it on the upper section of belt 20. By controlling the movement of moving wall 10, baggage 14 located on the upper section of belt 20 moves following the movement of moving wall 10.

It is clear to the individual skilled in the art that when moving wall 10 approaches threshold 22, first roller 24 must turn in order to wind belt 20 and keep the two sections of belt 20 more or less taut. Thus, by moving the moving wall 10 from a position close to baggage door 12 up to the back of the hold, baggage 14 placed in front of this moving wall 10 automatically is carried along toward the back of the hold. During baggage loading, it then suffices to control the movement of the wall toward baggage door 12 to bring baggage 14 located against moving wall 10 close to baggage door 12.

Figure 4:
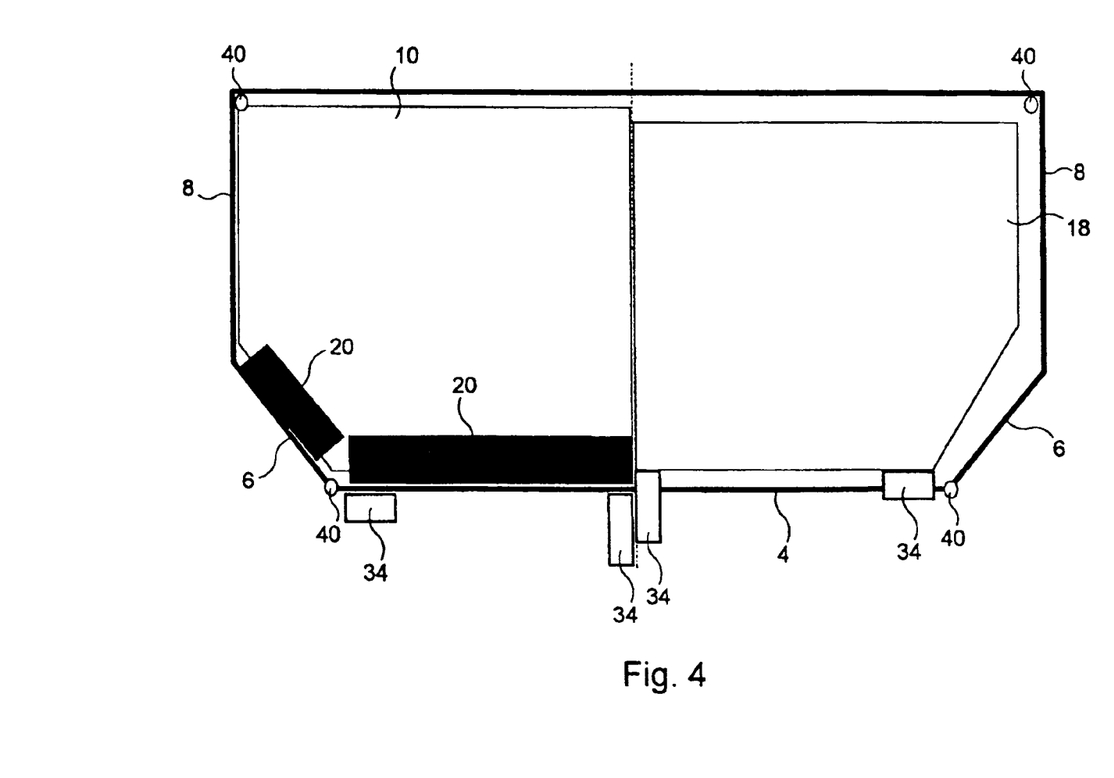
FIG. 4 is a schematic front view of a hold equipped with a device for movement of objects according to this invention, the left portion of each Figure partially showing the device for movement of objects according to this invention, whereas this is not visible on the right portion of this Figure, FIG. 5 schematically shows the doors of the hold of FIG. 2.

The hold shown on FIG. 2 is intended not only for the transport of baggage 14 but also of containers 18. The latter are loaded and unloaded through container door 16. A cargo loading system, also known under the name of CLS (English abbreviation for Cargo Loading System) then is provided for the movement of containers 18 in the hold. Such a system comprises in particular rollers 34 on which containers 18 moving in the hold come to slide (FIG. 4). Such a system is known to the individual skilled in the art and is not described in further detail here.

The cargo loading system provided in the hold shown on FIGS. 2 and 4, however, has the feature that rollers 34 of the system can be moved vertically. On the left portion of FIG. 4, rollers 34 are in downward retracted position so as to allow the passage of moving wall 10. On the right portion of FIG. 4, rollers 34 are in their active position, thus making it possible to facilitate the movement of containers 18 in the hold.

Figure 5:
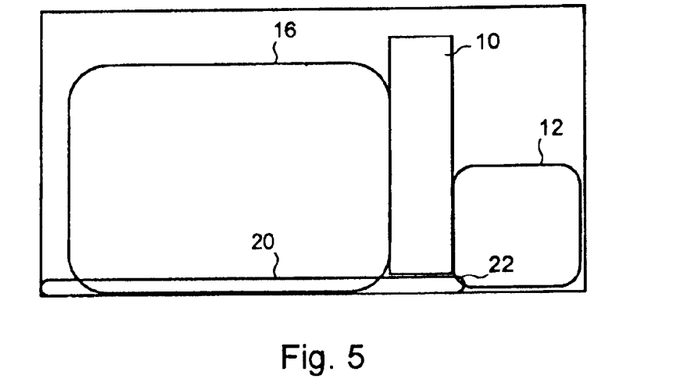

FIG. 5 illustrates the relative positioning of baggage door 12 in relation to container door 16. As can be seen in particular on FIG. 2, these two doors are arranged on opposite walls of the hold shown. These doors also are offset in relation to the longitudinal axis of the hold. It is seen that the openings corresponding to these two doors do not overlap. There even is seen spacing between these two door openings. Threshold 22 is arranged at the boundary of the opening of baggage door 12 on the side of container door 16. On this FIG. 5, moving wall 10 is shown in a position before the beginning of a loading. It is located in close proximity to threshold 22 (as on FIG. 8). On this Figure, moving wall 10 is located more or less between the two doors, without encroaching on their openings so as to leave the passage for a container 18 of LD3 type on the side of container door 16 as well as baggage door 12 clear. The space in front of baggage door 12 is left clear in order not to hinder the operators located inside the hold during the loading of baggage.

An advantage of the device described here is that it extends from threshold 22 to moving wall 10 and its size is adapted to the size of the space dedicated to the storage of baggage. It also is seen that no component of this device, when it is located, for example, in the position shown on FIG. 5, extends behind moving wall 10. Such a component inevitably would come to hinder introduction of containers 18 via container door 16. In this way, by virtue of the proposed construction, containers 18 can be freely introduced into the hold without being hindered by the device for the movement of baggage according to the invention.

Figure 6:
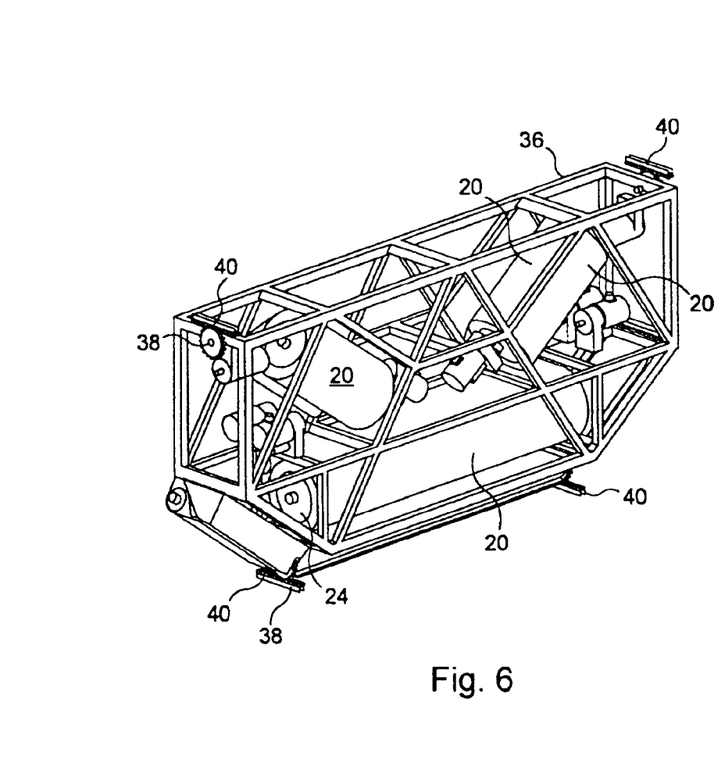
FIG. 6 is a perspective view of the front of a moving wall of a device according to the invention.
Figure 7:
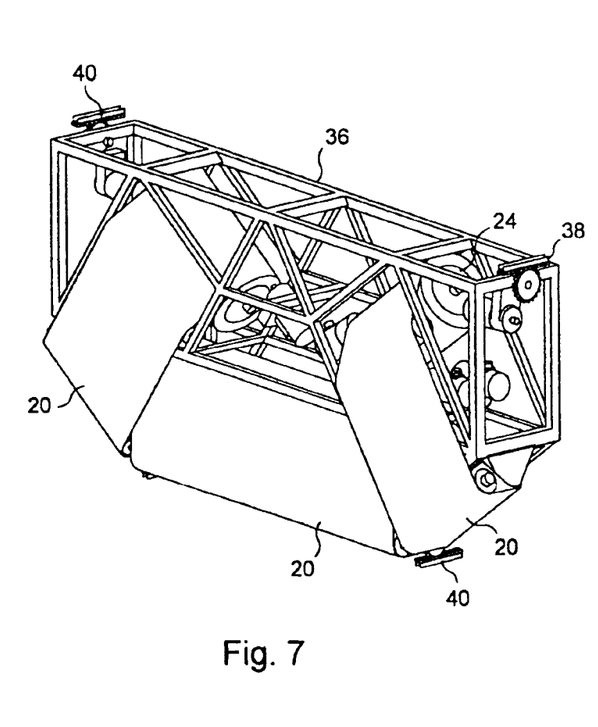
FIG. 7 is a view corresponding to FIG. 6 but showing the back of the same moving wall.

FIGS. 6 and 7 show in greater detail moving wall 10 shown schematically on the preceding Figures. It is seen primarily that this moving wall 10 is associated with three belts 20. For each of these belts 20, the functioning is similar to that described above. Here there is provided a belt 20 corresponding to central part 4 of floor 2 of the hold and two belts 20 each corresponding to a side part 6 of floor 2 of the described hold.

Moving wall 10 primarily comprises a frame 36 on which first rollers 24, guidance rollers 26 as well as drive motors are mounted.

A drive motor is provided for each of first rollers 24. Such motors make it possible to fully control the winding and unwinding of belts 20. They also make it possible to control the tautness in belts 20.

Figure 9:
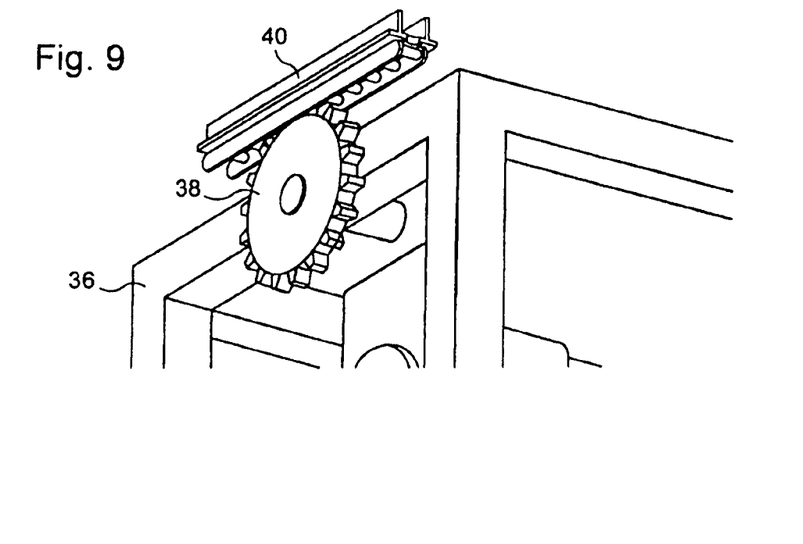
FIG. 9 is a detail view on an enlarged scale showing means for guidance and driving of a moving wall of a device according to the invention.

The presence of four cogwheels 38 also is seen on FIGS. 6 and 7. Each of these wheels is itself connected to a motor. All the motors are run in synchronized manner. Cogwheels 38 are intended to allow movement of moving wall 10. They cooperate with racks 40 fastened longitudinally in the hold of the aircraft. By having cogwheels 38 turn in one or the other direction, the moving wall moves forward or moves back in the hold. FIG. 9 shows a detail of the drive means on which there is seen a cogwheel 38 and a portion of rack 40.

Figure 8:
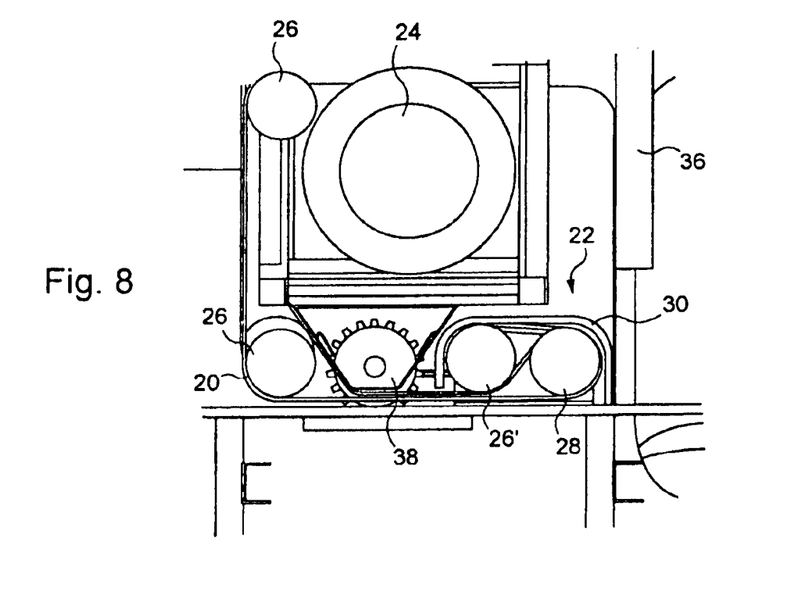
FIG. 8 is a detail view showing how a belt of a device according to the invention is connected to a moving wall.

As regards FIG. 8, it shows in slightly more detailed manner a view similar to the view of FIG. 3. In the position shown on FIG. 8, moving wall 10 is in its position closest to threshold 22. It is seen that in order to limit congestion of the device for movement of baggage according to this invention, moving wall 10 has in its lower portion, on the side of threshold 22, a housing allowing moving wall 10 to come to partially overlap threshold 22.

As is apparent from the preceding description, the device for movement of baggage according to the invention is adapted just as well to a hold accommodating only baggage as to a hold intended to accommodate both baggage and containers. The device according to the invention can be adapted to a number of configurations. The number of containers carried along in the hold can be variable. The device then adapts fully to the available space.

The proposed device spares the personnel given the job of placing the passengers' baggage in the hold of the aircraft from carrying (or throwing) the baggage toward the back of the hold. It suffices here to set the baggage down on belt 20 on the side of moving wall 10. Once belt 20 is loaded, moving wall 10 is moved, thus clearing a new surface of belt 20 to be loaded. The movement of moving wall 10 is accomplished, for example, with the aid of a control panel located near baggage door 12 and/or with the aid of a remote control.

The device according to the invention also makes it possible to save considerable time in the loading and unloading of baggage.

The device described above can be implemented in a relatively lightweight construction with a tubular frame. In that way, the weight of the device does not burden the overall weight of the aircraft too heavily. The length of the belts also is limited.

Of course, this invention is not limited to the preferred embodiment described above by way of non-limitative example. It also relates to all the embodiment variants within the capacity of the individual skilled in the art in the context of the claims below.

Driving of the device for moving objects described above is accomplished with the aid of cogwheels meshing with racks. This embodiment is a preferred embodiment but could be replaced by a variant. A system of cables and pulleys can come to replace the racks and the cogwheels. The moving wall, for example, can be fastened to one or more cables which are driven around the pulleys by an appropriate drive system. Other variants can be contemplated for the moving wall and its drive means.

The invention claimed is:

1. A device for moving an object in an aircraft hold, comprising:
   a moving wall; and
   at least one belt,
   wherein one end of the belt is attached to a roller on which the belt winds; the other end of the belt is fastened to the moving wall; a lower section of the belt extends from the moving wall up to a threshold; and an upper section of the belt extends from the threshold up to the moving wall, and
   wherein the threshold is positioned on a frontward side of the moving wall such that no roller or portion of the belt is positioned on a rearward side of the moving wall.

2. The device according to claim 1, wherein the roller rotates within the moving wall.

3. The device according to claim 1, wherein the roller is mounted on the moving wall.

4. The device according to claim 1, wherein the moving wall has at least one cogwheel connected to a motor to drive the moving wall on at least one rack fastened in the hold.

5. The device according to claim 1, wherein the threshold comprises a roller extending crosswise in relation to the belt; and the roller has an axis fixed in relation to the hold.

6. The device according to claim 1, comprising a plurality of belts, wherein each belt of the plurality of belts extends parallel to a level portion of the hold between the moving wall and the threshold corresponding to said belt.

7. An aircraft comprising a hold, wherein the hold comprises the device according to claim 1.

8. The aircraft according to claim 7, wherein the hold further comprises a cargo loading system comprising rollers to accommodate a container, wherein the rollers of the cargo loading system move between an active position in which a portion of the rollers extends above a floor of the hold and a retracted position in which the rollers are located beneath the floor of the hold.

9. The aircraft according to claim 8, wherein the hold comprises at least two access doors, wherein a first door is of sufficient size to allow introduction of the container of standardized size into the hold; a second door, of smaller size in relation to the first door, is positioned on the wall of the hold opposite to the wall on which the first door is located and is offset in relation to the first door; and the openings corresponding to the said first and second doors do not overlap.

10. The aircraft according to claim 9, wherein the threshold of the device is at the second door on one side of the first door.

11. The device according to claim 1, wherein the roller is positioned within the moving wall.

12. The device according to claim 11, wherein the threshold comprises a roller extending crosswise in relation to the belt such that, when the moving wall moves away from the threshold, the roller of the threshold pulls the belt to unwind from the roller in the moving wall.

13. The device according to claim 11, wherein the belt winds around the roller in the moving wall when the moving wall moves towards the threshold.

14. The device according to claim 11, wherein the belt unwinds from the roller in the moving wall when the moving wall moves away from the threshold.

* * * * *